United States Patent [19]

Hori et al.

[11] Patent Number: 5,446,064
[45] Date of Patent: Aug. 29, 1995

[54] THERMOPLASTIC ELASTOMER COMPOSITION

[75] Inventors: Kazuya Hori; Masahiro Yamanaka, both of Nagoya, Japan

[73] Assignee: Mitsubishi Chemical MKV Company, Tokyo, Japan

[21] Appl. No.: 208,295

[22] Filed: Mar. 10, 1994

[30] Foreign Application Priority Data

| Mar. 30, 1993 | [JP] | Japan | 5-072050 |
| Mar. 30, 1993 | [JP] | Japan | 5-072051 |
| Dec. 27, 1993 | [JP] | Japan | 5-333244 |
| Dec. 27, 1993 | [JP] | Japan | 5-333245 |

[51] Int. Cl.$^6$ .............................................. C08L 23/00
[52] U.S. Cl. .................................... 524/536; 524/296; 524/297; 524/425; 524/445; 524/451; 525/214
[58] Field of Search ............ 524/536, 296, 297, 425, 524/445, 451; 525/214

[56] References Cited

U.S. PATENT DOCUMENTS

| 4,806,581 | 2/1989 | Walker | 524/536 |
| 5,270,381 | 12/1993 | Yamanaka et al. | 524/569 |
| 5,314,941 | 5/1994 | Yamanaka et al. | 524/445 |

FOREIGN PATENT DOCUMENTS

| 0336735 | 10/1989 | European Pat. Off. . |
| 0513687 | 11/1992 | European Pat. Off. . |
| 2223425 | 10/1974 | France . |
| 2190390 | 11/1987 | United Kingdom . |

Primary Examiner—Peter D. Mulcahy
Attorney, Agent, or Firm—Oblon, Spivak, McClelland, Maier, & Neustadt

[57] ABSTRACT

A thermoplastic elastomer composition comprising 100 parts by weight of a crystalline chlorinated polyethylene with a chlorination degree of from 20 to 45% and a heat of crystal fusion of from 5 to 35 cal/g as measured by a DSC method, obtained by chlorinating a polyethylene having a weight average molecular weight of from 100,000 to 750,000, from 1 to 100 parts by weight of a crystalline polyolefin and from 5 to 200 parts by weight of a plasticizer.

11 Claims, No Drawings

THERMOPLASTIC ELASTOMER COMPOSITION

The present invention relates to a thermoplastic elastomer composition having improved compression set, low temperature properties, blocking resistance and moldability.

With respect to elastomer materials, there has been an increasing demand for improvement of their properties year by year. Particularly, in the field of automobiles, excellent compression set is demanded for materials of e.g. glass runs, weather strips and flush-mount-moles.

Heretofore, soft vinyl chloride resins have been widely used as such materials, since they have flexible rubber-like texture and they are superior to vulcanized rubber in the moldability, weather resistance and tinting properties, and they have an advantage also from the viewpoint of costs. However, they are inferior to vulcanized rubber in the compression set, and their softening point is low, whereby their application for high temperatures has been limited. An attempt has been made for improvement by modifying the vinyl chloride resins to have high degrees of polymerization, but no satisfactory results have been obtained.

Various proposals have also been made with an aim to improve the compression set of the vinyl chloride resins wherein nitrile rubbers having crosslinked structures are kneaded with vinyl chloride resins. However, such compositions are inferior in the processability, and have drawbacks in the productivity.

Further, Japanese Unexamined Patent Publication No. 309546/1988 discloses a process for producing an elastomer composition which comprises, as resin components, a chlorinated polyethylene, a vinyl chloride resin and a partially crosslinked acrylonitrile-butadiene copolymer. However, in this process, it is essential to use a vinyl chloride resin and to first prepare a precursor composition having the vinyl chloride resin, the partially crosslinked acrylonitrile-butadiene copolymer and a plasticizer uniformly dispersed and kneaded, and then add the chlorinated polyethylene and a crosslinking agent thereto, followed by blending and kneading. This process has a feature that the elastomer composition itself has a crosslinked structure. This publication discloses the effects of the composition such as oil resistance, weather resistance, ozone resistance and heat resistance, but does not teach a technical concept that good high-temperature creep characteristics are obtainable without crosslinking the composition, as in the present invention.

The present applicants have previously found that physical properties such as compression set and weather resistance can be improved by blend compositions comprising certain specific chlorinated polyethylenes and plasticizers and have proposed such blend compositions in Japanese Patent Applications No. 105959/1991 and No. 151870/1991. These compositions are excellent in the kneading processability, since the molecular weight of the polyethylene to be chlorinated is relatively low. However, they still have a drawback to be overcome, such as a blocking problem due to bleeding of a plasticizer. Further, they have a problem that when their molded products are mounted to e.g. automobiles, such molded products are likely to produce an abnormal sound such as squeaking sound with glass or with automobile bodies, and thus they are not necessarily satisfactory for practical application depending upon the particular uses.

The present applicants have further proposed in Japanese Patent Application No. 49763/1992 to use a high molecular weight chlorinated polyethylene in combination with a usual vinyl chloride resin or with a low molecular weight chlorinated polyethylene for the purpose of improving the compression set, low temperature characteristics, blocking resistance and moldability.

The subject matters of the above three Japanese applications have been patented by U.S. Pat. No. 5,270,381.

The present applicants have now found that such an object can be accomplished also by incorporating a crystalline polyolefin other than the vinyl chloride resin or the low molecular weight chlorinated polyethylene, and have finally accomplished present invention.

Further, the present applicants have previously proposed in Japanese Unexamined Patent Publication No. 111945/1991 an elastomer composition which is prepared by kneading a chlorinated polyethylene with a rubber material having a crosslinked structure in its molecule and which has excellent high-temperature creep characteristics even without vulcanization or crosslinking. The present applicants have now found that by kneading a crystalline polyolefin to such a composition, the melt viscosity can be lowered so that the moldability can be improved, and it is possible to obtain an elastomer composition having excellent high-temperature creep characteristics even without vulcanization or crosslinking, and have finally accomplished the present invention.

Namely, a first object of the present invention is to provide a thermoplastic elastomer composition having excellent compression set, low temperature characteristics, blocking resistance, moldability and strain recovery.

A second object of the present invention is to provide a thermoplastic elastomer composition having excellent high-temperature creep characteristics and molding processability.

Thus, the present invention provides a thermoplastic elastomer composition comprising 100 parts by weight of a crystalline chlorinated polyethylene with a chlorination degree of from 20 to 45% and a heat of crystal fusion of from 5 to 35 cal/g as measured by a DSC method, obtained by chlorinating a polyethylene having a weight average molecular weight of from 100,000 to 750,000, from 1 to 100 parts by weight of a crystalline polyolefin and from 5 to 200 parts by weight of a plasticizer.

The present invention also provides such an elastomer composition which further contains a rubber material containing a crosslinked component insoluble in a good solvent for a non-crosslinked rubber, in an amount of from 20 to 400 parts by weight per 100 parts by weight of the crystalline chlorinated polyethylene.

Now, the present invention will be described in detail with reference to the preferred embodiments.

It is important that the crystalline chlorinated polyethylene as a main resin component of the elastomer composition of the present invention is a crystalline chlorinated polyethylene of a relatively high molecular weight with a chlorination degree of from 20 to 45% and a heat of crystal fusion of from 5 to 35 cal/g, preferably from 5 to 25 cal/g, as measured by a DSC method, obtained by chlorinating a polyethylene having a weight average molecular weight of from 100,000 to 750,0000, preferably from 200,000 to 750,000, more preferably from 250,000 to 750,000. The former range of the heat of crystal fusion corresponds to a polyethylene crystal residue i.e. a so-called crystallinity within a range of from 10 to 75%, and the latter range of the heat of crystal fusion corresponds to a crystallinity within a range of from 10 to 50%. Further, the above molecular weight indicates a value of a weight average molecular weight measured by GPC (gel permeation chromatography).

If the polyethylene before chlorination is of a high molecular weight, the resulting chlorinated polyethylene will have good physical properties such as tensile strength and scratch resistance. However, if the molecular weight is less than 100,000, blocking resistance and scratch resistance tends to be inadequate, and sticking or bridging of the pellets tends to occur during the molding, or the surface of the molded products tends to be tacky or susceptible to scratching by friction such as brushing. Further, the compression set as an index for rubber elasticity tends to be poor. On the other hand, if it exceeds 750,000, the processability tends to be remarkably poor, and it will be necessary to incorporate a large amount of a vinyl chloride resin or a crystalline polyolefin and a plasticizer to improve the processability, whereby the desired characteristics attributable to the high molecular weight chlorinated polyethylene will be impaired.

If the chlorination degree of the chlorinated polyethylene is less than 20%, the compatibility with the plasticizer tends to be poor, whereby it will be difficult to lower the hardness, and the weather resistance tends to be poor. On the other hand, if it exceeds 45%, the rubber elasticity tends to be low, and the desired compression set and low temperature properties tend to be hardly obtained. Further, if the heat of crystal fusion is less than 5 cal/g, no adequate effect for improving the compression set tends to be obtained. On the other hand, if it exceeds 35 cal/g, it tends to be difficult to lower the hardness, and the processability tends to be remarkably poor.

The heat of crystal fusion as measured by a DSC (differential scanning calorimetry) method of the chlorinated polyethylene to be used in the present invention, is the value calculated from the total area of crystal peaks of the DSC chart as measured at a temperature raising rate of 10° C./min by a differential scanning calorimeter, and the value being less than 5 cal/g indicates that there is no substantial remaining crystal.

Further, the crystal melting point as measured by a DSC method, which will be mentioned hereinafter, is a temperature of the maximum peak among all crystal peaks at the time of measuring the heat of crystal fusion by a DSC method. The crystal melting point of the chlorinated polyethylene to be used in the present invention is usually within a range of from 110° to 140° C.

The chlorinated polyethylene to be used in the present invention preferably has a DOP oil absorption of at least 25, as measured by using di-2-ethylhexyl phthalate (DOP) as the oil. For the determination of the DOP oil absorption, DOP is gradually added to 100 g of the chlorinated polyethylene powder at a temperature of 23° C. under stirring, and the DOP absorption is represented by the volume (ml) of added DOP when the chlorinated polyethylene powder has conglomerated. The DOP oil absorption being at least 25 means that even when 25 ml of DOP is added, the chlorinated polyethylene powder still remains to be in a powder form without forming a conglomerate, or any conglomerate formed may readily be disintegrated by a slight force or impact. Its measurement was conducted in accordance with JIS K 5101.

The crystalline polyolefin as an essential resin component of the present invention is a solid high molecular weight resin produced by polymerizing an olefin such as ethylene, propylene, butene-1, pentene-1 or 4-methylpentene by a conventional method. The crystalline polyolefin may, for example, be a low-density polyethylene (0.910–0.925 g/cm$^3$), a medium-density polyethylene (0.926–0.940 g/cm$^3$), a high-density polyethylene (0.941–0.965 g/cm$^3$) or polypropylene produced by either a high pressure method or a low pressure method. Further, a crystalline block copolymer of ethylene with propylene may also be employed. Further, the crystalline polyolefin is preferably the one having a melt flow ratio (MFR) within a range of from 0.01 to 100 g/10 min, preferably from 0.1 to 50 g/10 min, as measured in accordance with JIS K 6760. For the thermoplastic elastomer composition of the present invention, it is particularly preferred to employ a high-density polyethylene or a linear low-density polyethylene.

The linear low-density polyethylene is a substantially linear copolymer obtainable by copolymerization of ethylene with a small amount of other $\alpha$-olefins, for example, at least one $C_3$–$C_{10}$ $\alpha$-olefin such as 1-butene, 1-hexene, 1-octene or 4-methyle-1-pentene and has alkyl side chains derived from the above other olefins sporadically on the main chain.

The proportions of the chlorinated polyethylene and the crystalline polyolefin are such that the crystalline polyolefin is in an amount of from 1 to 100 parts by weight, preferably from 5 to 70 parts by weight, per 100 parts by weight of the chlorinated polyethylene. If the proportion of the crystalline polyolefin is less than 1 part by weight per 100 parts by weight of the chlorinated polyethylene, the processability and the moldability will not be improved. On the other hand, if it exceeds 100 parts by weight, the rubbery touch will be impaired.

Further, when the rubber material which will be described hereinafter, is incorporated to the composition of the present invention, the amount of the crystalline polyolefin should be up to 70 parts by weight, per 100 parts by weight of the chlorinated polyethylene. If the amount is more than 70 parts by weight, the dispersion of the rubber material tends to be poor, whereby not only the moldability, but also the physical property such as impact resilience will deteriorate.

The plasticizer as an essential component of the thermoplastic elastomer composition of the present invention is not particularly limited, so long as it is the one commonly used for vinyl chloride resins, and it may, for example, be a phthalate plasticizer such as di-2-ethylhexyl phthalate, di-n-octyl phthalate, diisodecyl phthalate, dibutyl phthalate or dihexyl phthalate; a straight chain dibasic acid ester plasticizer such as dioctyl adipate, or dioctyl sebacate; a trimellitate plasticizer; a polyester polymer plasticizer; an epoxy plasticizer such as epoxidized soybean oil, epoxidized linseed oil or an epoxy resin; a phosphate plasticizer such as triphenyl phosphate, trixylyl phosphate or tricresyl phosphate. These plasticizers may be used alone or in combination as a mixture of two or more of them.

The amount of the plasticizer is suitably determined depending upon the types of resin components, their proportions, the crystallinity of the chlorinated polyethylene, the presence or absence of other additives, or the desired hardness of the product. It is usually selected within a range of from 5 to 200 parts by weight, preferably from 10 to 150 parts by weight, more preferably from 15 to 75 parts by weight, per 100 parts by weight of the chlorinated polyethylene. If the plasticizer is too little, it tends to be difficult to obtain a product of low hardness. On the other hand, if it is excessive, it tends to be difficult to suppress the bleeding.

To the composition of the present invention, a rubber material containing a crosslinked component insoluble in a good solvent for non-crosslinked rubber, may be added to further improve the compression set.

The rubber material containing a crosslinked component insoluble in a good solvent for non-crosslinked rubber, to be used in the present invention, may be produced by introducing a crosslinked structure into rubber molecules by e.g. a method wherein a polyfunctional monomer is added to the polymerization system during the production of the rubber such as acrylonitrile-butadiene rubber (NBR), methyl methacrylate-butadiene-styrene rubber (MBS), acrylic rubber (AR), styrene-butadiene rubber (SBR), isoprene rubber (IR), chloroprene rubber (CR), ethylene-propylene rubber (EPR), chlorinated polyethylene rubber (Cl-PER), ethylene-vinyl acetate rubber (EVA) or urethane rubber (UR), or a method wherein crosslinking is conducted by means of an organic peroxide after the production of the rubber. It is particularly preferred to use the one wherein the crosslinked structure is formed by adding a polyfunctional monomer during the production of the rubber material.

Such a rubber material usually has solubility of not more than 80 wt %, preferably not more than 50 wt %, in a good solvent to non-crosslinked rubber. With a rubber material having a solubility exceeding 80 wt %, it tends to be difficult to accomplish the object of improving the compression set. The good solvent for non-crosslinked rubber means, for example, tetrahydrofuran (THF) for a rubber material such as NBR, MBS, AR, SBR, CR, EVA or UR, toluene for a rubber material such as Cl-PER or EPR, or chloroform for IR.

In the present invention, it has been confirmed that when NBR having an acrylonitrile content of from 20 to 30 wt %, is incorporated, an elastomer composition excellent in the low temperature flexibility (the low temperature characteristics) can be obtained.

Thus, the amount of the rubber material is usually within a range of from 20 to 400 parts by weight, preferably from 50 to 300 parts by weight, per 100 parts by weight of the chlorinated polyethylene. If the amount of the rubber material is too small, improvement of the compression set will be inadequate. On the other hand, if the amount is too much, the resulting elastomer composition will be hard, whereby the molding processability and the physical properties of the composition will be poor.

To the elastomer composition of the present invention, an inorganic filler may be incorporated to such an extent not to impair the compression set or the low temperature characteristics. When a substantial amount of a plasticizer is incorporated to a resin component such as a high molecular weight chlorinated polyethylene, an inorganic filler is effective for the prevention of bleeding of the plasticizer and for the improvement of processability such as roll kneading efficiency. As such an inorganic filler, a common inorganic powder such as calcium carbonate, clay or talc may be mentioned. The amount of such an inorganic filler is usually at most 400 parts by weight, preferably at most 200 parts by weight, more preferably at most 100 parts by weight, per 100 parts by weight of the chlorinated polyethylene.

To the thermoplastic elastomer composition of the present invention, various additives such as a stabilizer, a lubricant, an antioxidant, an ultraviolet absorber, a blowing agent, a flame retardant, a pigment and an impact resistance-improving agent, may be incorporated, as the case requires. Further, a polymer other than those described above, such as a vinyl chloride resin, a chlorinated polyethylene prepared by chlorinating a polyethylene having a molecular weight of less than 100,000, an urethane resin, or an acrylic rubber or NBR containing no crosslinked component, may be incorporated.

To prepare the thermoplastic elastomer composition of the present invention, the chlorinated polyethylene having a relatively high molecular weight, the crystalline polyolefin and the plasticizer may be kneaded, if necessary together with the rubber material or the above mentioned various additives, under a shearing force while heating at a temperature of at least the crystal melting point of the chlorinated polyethylene or the crystalline polyethylene, whichever is higher.

By kneading under such conditions, it is possible to obtain an elastomer composition which is excellent in the compression set, low temperature characteristics, blocking resistance and moldability. The composition to which the rubber material is further incorporated, is excellent particularly in the high temperature creep characteristics (compression set). If the temperature is lower than the crystal melting point, the plasticizer would penetrate only at the amorphous portions of the crystalline chlorinated polyethylene, whereby there will be no substantial change in the crystal structure after kneading. Whereas, when the mixture is kneaded under a shearing force while being heated at a temperature of at least the crystal melting point, it is believed that the plasticizer penetrates also to the crystal portions, whereby a new network structure will be formed among molecular chains when the chlorinated polyethylene is recrystallized, and the rubber elasticity such as compression set will thereby be improved.

Further, it is believed that since the molecular weight of the chlorinated polyethylene is large, a large amount of the plasticizer can be contained among the molecular chains, whereby the blocking resistance will be improved, and the low temperature properties will be excellent.

An apparatus to be used for mixing the above described blend components, may be any apparatus so long as it is capable of uniformly mixing them. For example, it may be a Henschel mixer, a ribbon blender or a planetary mixer. To knead the mixture, an apparatus capable of kneading it under a shearing force under heating, such as an extruder, a roll mill, a Banbury mixer or a kneader, can be used. As a kneading method, it is possible to employ a method wherein an extruder having multistage inlets, is used so that in an earlier stage the resin components and various additives are introduced, and at a later stage, the plasticizer is introduced. The upper limit of the heating temperature is preferably within a range where a heat deterioration of the chlorinated polyethylene is negligible, specifically not higher than 210° C. Further, the kneading temperature is usually within a range of from 130° to 210° C., preferably from 150° to 200° C. Now, the present invention will be described in further detail with reference to Examples. However, it should be understood that the present invention is by no means restricted to such specific Examples.

In these Examples, "parts" and "%" mean "parts by weight" and "% by weight" respectively, unless otherwise specified.

Further, various properties of the thermoplastic elastomer composition were evaluated as follows.

Hardness:

With respect to the same test piece as used for the measurement of the compression set, the hardness was measured in accordance with JIS K6301 (JIS A hardness).

Tensile properties:

In accordance with JIS K6301, a JIS No. 3 dumbbell specimen was used. The test was conducted at a tensile speed of 200 mm/min, and the tensile properties were shown by the tensile strength and the elongation.

Compression set:

Measured in accordance with JIS K6301 at 70° C. for 22 hours under a compression of 25%.

Low temperature characteristics:

The low temperature characteristics are represented by the temperature at which the apparent modulus of elasticity in torsion becomes to be $3.17 \times 10^3$ kg/cm$^2$ in the method for testing a low temperature torsion in accordance with JIS K6301.

Impact resilience:

The impact resilience was measured at 23° C. in accordance with JIS K6301.

Melt viscosity:

The melt viscosity was measured by a capillary rheometer using a 1 mm$\phi$ die (L/D=20) and represented by the apparent viscosity (poise) at a shearing velocity of $1.2 \times 10^2$ sec$^{-1}$ at 180° C.

Extrusion moldability:

An L-form die was attached to a 40 mm extruder (L/D=24), and profile extrusion was conducted at a die temperature of 180° C. The surface condition or edge damage of the molded product was visually evaluated.

O: Surface condition good and no edge damage observed.

Δ: Surface condition poor or edge damage observed.

X: Surface condition poor and substantial edge damage observed.

Injection moldability:

The injection moldability was evaluated by the length in the spiral flow test.

Conditions: Cylinder $C_1$ 160° C., $C_2$ 170° C. $C_3$ 180° C.,

Nozzle temperature 180° C., injection pressure 600 kg/cm$^2$ die temperature 40° C.

Chlorinated polyethylenes, crystalline polyolefins, rubber materials and plasticizers used in the Examples are as follows:

| Chlorinated polyethylenes: | | Weight average molecular weight before chlorination | Chlorination degree (%) | Heat crystal fusion (cal/g) | Crystal melting point (°C.) | DOP oil absorption |
|---|---|---|---|---|---|---|
| A | Test sample | 350,000 | 31 | 8.3 | 118 | at least 50 |
| B | Test sample | 250,000 | 31 | 10.9 | 128 | at least 50 |
| C | Test sample | 180,000 | 35 | 9.2 | 126 | at least 50 |
| D | Test sample | 350,000 | 30 | 9.8 | 118 | at least 50 |
| E | Test sample | 170,000 | 30 | 10.5 | 122 | at least 50 |

| Crystalline polyolefins | | MFR (g/10 min) | Density (g/cm$^3$) | Crystal melting point (°C.) |
|---|---|---|---|---|
| G | High-density polyethylene | 20 | 0.960 | 130 |
| H | Linear low density polyethylene | 2 | 0.920 | 126 |
| I | High-density polyethylene | 30 | 0.950 | 130 |

| Rubber materials (partially cross-linked NBRs) | | Acrylonitrile content (%) | Solubility in THF (%) |
|---|---|---|---|
| L | PBN-7 (made by Japan synthetic Rubber Co., Ltd.) | 40 | 5 |
| M | Test sample | 25 | 5 |
| N | Test sample | 30 | 5 |

| Plasticizers | |
|---|---|
| X | Di-2-ethylhexyl phthalate (DOP) |
| Y | Di-isodecyl adipate (DIDA) |
| Z | Di-isononyl adipate (DINA) |

EXAMPLES 1 TO 6 AND COMPARATIVE EXAMPLES 1 AND 2

The chlorinated polyethylene, the crystalline polyolefin, DOP and calcium carbonate of the types and amounts as identified in Table 1 and 2 parts by weight of a lead-type stabilizer, were heated and mixed by a Henschel mixer, and the mixture was kneaded by a Banbury mixer with a jacket temperature of 120° C. at a rotational speed of 80 rpm for 3 minutes. The resin temperature at that time reached 192° C. Then, the kneaded product was cooled, then transferred to a roll mill at a surface temperature of 150° C. and formed into a sheet having a thickness of 2 mm. This sheet was further pressed at 180° C. for 5 minutes to obtain a predetermined test piece.

The evaluation results are shown in Table 1.

TABLE 1

| | Examples | | | | | | Comparative Examples | |
|---|---|---|---|---|---|---|---|---|
| | 1 | 2 | 3 | 4 | 5 | 6 | 1 | 2 |
| Blend composition (parts by weight) | | | | | | | | |
| Chlorinated polyethylene | | | | | | | | |
| (type) | A | A | A | B | B | C | A | C |
| (amount) | 100 | 100 | 100 | 100 | 100 | 100 | 100 | 100 |
| Crystalline polyolefin | | | | | | | | |
| (type) | G | G | H | G | H | G | — | — |
| (amount) | 10 | 20 | 15 | 5 | 10 | 20 | 0 | 0 |

TABLE 1-continued

|  | Examples | | | | | | Comparative Examples | |
|---|---|---|---|---|---|---|---|---|
|  | 1 | 2 | 3 | 4 | 5 | 6 | 1 | 2 |
| DOP (amount) | 40 | 40 | 40 | 40 | 40 | 40 | 40 | 40 |
| Calcium carbonate (amount) | 0 | 0 | 0 | 0 | 5 | 0 | 0 | 0 |
| Quality evaluation | | | | | | | | |
| Hardness (JIS-A) | 65 | 75 | 70 | 50 | 57 | 75 | 60 | — |
| Tensile strength (kg/cm$^2$) | 170 | 165 | 165 | 110 | 105 | 80 | 185 | — |
| Elongation at breakage (%) | 550 | 630 | 600 | 560 | 550 | 500 | 560 | — |
| Compression set (%) | 32 | 35 | 35 | 33 | 34 | 40 | 33 | — |
| Low temperature characteristics (°C.) | −48 | −47 | −47 | −44 | −43 | −38 | −48 | — |
| Extrusion moldability | ○ | ○ | ○ | ○ | ○ | ○ | X | — |
| Injection moldability (cm) | — | 52 | — | — | 90 | 140 | 20 | 110 |

With the chlorinated polyethylene containing the crystalline polyolefin, the melt viscosity is low, and the fluidity is thereby improved, whereby the surface condition of the extrusion molded product is good with no edge damage, and the composition is excellent also in the injection moldability.

On the other hand, with the high molecular weight chlorinated polyethylene having no crystalline polyolefin blended thereto, the melt viscosity does not decrease, whereby the surface of the molded product is poor and an edge damage is observed.

EXAMPLES 7 TO 10 AND COMPARATIVE EXAMPLE 3

The chlorinated polyethylenes, the rubber materials and the crystalline polyolefins of the types and the amounts as identified in Table 2, 40 parts by weight of DOP (except for Comparative Example 3 wherein no DOP was incorporated) and 4 parts by weight of a lead-type powder stabilizer, were mixed in a beaker, and the mixture was kneaded by a Brabender Plastograph at a cell temperature of 150° C. at 50 rpm for 10 minutes. The resin temperature at that time was at least 180° C. Then, the kneaded product was formed into a sheet by a mill roll at a surface temperature of 150° C. The sheet was further pressed at 180° C. for 5 minutes to obtain a predetermined test piece.

The evaluation results are shown in Table 2.

TABLE 2

|  | Examples | | | | Comparative Example |
|---|---|---|---|---|---|
|  | 7 | 8 | 9 | 10 | 3 |
| Blend composition (parts by weight) | | | | | |
| Chlorinated polyethylene | D-100 | D-100 | E-100 | D-100 | D-100 |
| Rubber material | L-50 | L-100 | L-200 | L-100 | L-100 |
| Crystalline polyolefin | G-10 | G-20 | G-20 | H-20 | — |
| Evaluation results | | | | | |
| Hardness | 62 | 66 | 62 | 63 | 57 |
| Compression set (%) | 28 | 26 | 22 | 25 | 26 |
| Impact resilience (%) | 55 | 42 | 28 | 43 | 49 |
| Melt viscosity (poise) | 2.6 × 10$^4$ | 2.4 × 10$^4$ | 2.0 × 10$^4$ | 2.6 × 10$^4$ | 4.0 × 10$^4$ |
| Extrusion moldability | ○ | ○ | ○ | ○ | X |

As shown in Table 2, in Comparative Example 3 wherein no crystalline polyolefin was incorporated, the apparent melt viscosity is high, and the moldability is very poor.

EXAMPLES 11 TO 16

The chlorinated polyethylenes, the crystalline polyolefins, the rubber materials and the plasticizers of the types and amounts as identified in Table 3, and 5 parts by weight of a barium-zinc type stabilizer, were heated and mixed by a Henschel mixer, and the mixture was kneaded by a Banbury mixer with a jacket temperature of 120° C. at a rotational speed of 80 rpm for 3 minutes.

The resin temperature at that time reached at least 180° C. Then, the kneaded product was cooled, then transferred to a roll mill at a surface temperature of 150° C. and formed into a sheet having a thickness of 2 mm. This sheet was further pressed at 180° C. for 5 minutes to obtain a predetermined test piece.

The evaluation results are shown in Table 3.

TABLE 3

|  | Example | | | | | |
|---|---|---|---|---|---|---|
|  | 11 | 12 | 13 | 14 | 15 | 16 |
| Blend composition (parts by weight) | | | | | | |
| Chlorinated polyethylene | | | | | | |
| (type) | A | A | A | A | A | A |
| (amount) | 100 | 100 | 100 | 100 | 100 | 100 |
| Crystalline polyolefin | | | | | | |
| (type) | I | I | I | I | I | I |
| (amount) | 20 | 20 | 20 | 20 | 20 | 20 |
| Plasticizer | | | | | | |
| (type) | X | Y | Y | Z | X | X |

TABLE 3-continued

| | Example | | | | | |
|---|---|---|---|---|---|---|
| | 11 | 12 | 13 | 14 | 15 | 16 |
| (amount) Rubber material | 40 | 40 | 50 | 40 | 40 | 40 |
| (type) | M | N | N | N | L | L |
| (amount) | 100 | 100 | 50 | 100 | 100 | 200 |
| Evaluation results | | | | | | |
| Hardness | 64 | 64 | 62 | 65 | 65 | 60 |
| Compression set (%) | 26 | 26 | 30 | 26 | 26 | 20 |
| Low temperature characteristics | −47 | −49 | −52 | −50 | −40 | −32 |
| Impact resilience (%) | 56 | 56 | 57 | 55 | 42 | 36 |

As is evident from Tables 2 and 3, the elastomer compositions having the rubber materials incorporated, are superior in the compression set to the compositions (Table 1) having no rubber material incorporated. Further, as is evident from Table 3, the elastomer composition having NBR with an acrylonitrile content of from 20 to 30 wt % incorporated, has remarkably improved low temperature characteristics over the one with an acrylonitrile content of 40 wt %.

As described in the foregoing, the thermoplastic elastomer composition of the present invention having a crystalline polyolefin incorporated to a composition comprising a high molecular weight chlorinated polyethylene and a plasticizer or a rubber material having a crosslinked component, facilitates the kneading and processing and improves the moldability of a high molecular weight chlorinated polyethylene which is otherwise poor in the moldability, whereby the desired characteristics of the high molecular weight chlorinated polyethylene, i.e. the compression set, the low temperature characteristics and the blocking resistance, can fully be provided. Accordingly, with the composition of the present invention, a usual processing method such as extrusion molding, compression molding, calendering, blow molding or injection molding, can be employed. The processability can thereby be remarkably improved, and it is possible to obtain a molded product having excellent high temperature creep characteristics. The molded product may, for example, be window seals, glass runs, weather strips, wire sheaths or packings to be mounted on e.g. automobiles. Further, the composition of the present invention is useful also in various fields where rubber elasticity and high temperature creep characteristics are required.

We claim:

1. A thermoplastic elastomer composition comprising 100 parts by weight of a crystalline chlorinated polyethylene with a chlorination degree of from 20 to 45% and a heat of crystal fusion of from 5 to 35 cal/g as measured by a DSC method, obtained by chlorinating a polyethylene having a weight average molecular weight of from 100,000 to 750,000, from 1 to 100 parts by weight of a crystalline polyolefin and from 5 to 200 parts by weight of a plasticizer.

2. The thermoplastic elastomer composition according to claim 1, wherein the crystalline chlorinated polyethylene is the one obtained by chlorinating a polyethylene having a weight average molecular weight of from 200,000 to 750,000.

3. The thermoplastic elastomer composition according to claim 1 or 2, wherein the crystalline chlorinated polyethylene has a DOP oil absorption of at least 25 as measured by using di-2-ethylhexyl phthalate (DOP) as the oil.

4. The thermoplastic elastomer composition according to claim 1, wherein the crystalline polyolefin is in an amount of from 5 to 70 parts by weight.

5. The thermoplastic elastomer composition according to claim 1 or 4, wherein the crystalline polyolefin is a high-density polyethylene or a linear low-density polyethylene.

6. The thermoplastic elastomer composition according to claim 1 or 4, which further contains a rubber material containing a crosslinked component insoluble in a good solvent for non-crosslinked rubber, in an amount of from 20 to 400 parts by weight, per 100 parts by weight of the crystalline chlorinated polyethylene.

7. The thermoplastic elastomer composition according to claim 6, wherein the solubility of the rubber material in the good solvent is at most 80 wt %.

8. The thermoplastic elastomer composition according to claim 6, wherein the rubber material is an acrylonitrile-butadiene copolymer (NBR).

9. The thermoplastic elastomer composition according to claim 8, wherein the acrylonitrile content of NBR is from 20 to 30 wt %.

10. The thermoplastic elastomer composition according to claim 1, which further contains a filler in an amount of up to 400 parts by weight per 100 parts by weight of the crystalline chlorinated polyethylene.

11. The thermoplastic elastomer composition according to claim 10, wherein the filler is calcium carbonate, clay or talc.

* * * * *